United States Patent [19]

Casteleiro

[11] Patent Number: 5,012,481
[45] Date of Patent: Apr. 30, 1991

[54] FLASHLAMP LINE REPLACEABLE UNIT
[75] Inventor: Carlos A. Casteleiro, Orlando, Fla.
[73] Assignee: Martin Marietta Corporation, Bethesda, Md.
[21] Appl. No.: 491,010
[22] Filed: Mar. 9, 1990
[51] Int. Cl.⁵ .................................... H01S 3/093
[52] U.S. Cl. ................................ 372/72; 372/66; 372/35; 372/69; 372/92
[58] Field of Search ............ 372/69, 70, 72, 66, 372/92

[56] References Cited

U.S. PATENT DOCUMENTS

| | | | |
|---|---|---|---|
| 3,413,567 | 11/1968 | Hannwacker et al. | 372/72 |
| 3,528,030 | 8/1980 | Bickel et al. | 372/72 |
| 3,577,095 | 5/1971 | Benner | 372/72 |
| 3,611,189 | 10/1971 | Stone et al. | |
| 3,735,285 | 5/1973 | Pawlak | |
| 3,764,935 | 10/1973 | Iorizzo et al. | 372/72 |
| 3,891,945 | 6/1975 | Schlossberg et al. | 372/72 |
| 4,096,450 | 6/1978 | Hill et al. | |
| 4,313,092 | 1/1982 | Kaule | |
| 4,378,601 | 3/1983 | Eggleston, III et al. | 372/70 |
| 4,506,369 | 3/1985 | Houston | 372/72 |
| 4,566,107 | 1/1986 | Kitaura et al. | 372/72 |
| 4,653,061 | 3/1987 | Fukae | |
| 4,730,324 | 3/1988 | Azad | 372/72 |
| 4,734,917 | 3/1988 | Johnson | |
| 4,858,243 | 8/1989 | Bar-Joseph | 372/72 |
| 4,881,233 | 11/1989 | von Arb et al. | 372/72 |
| 4,894,837 | 1/1990 | DiFonzo et al. | 372/72 |
| 4,933,946 | 6/1990 | Kuper et al. | 372/66 |

Primary Examiner—Leon Scott, Jr.
Attorney, Agent, or Firm—Julian C. Renfro; Michael L. Slonecker; Gay Chin

[57] ABSTRACT

An improved pumping arrangement for use in a face pumped or edge pumped slab laser, this arrangement comprising upper and lower housing members able to be removably secured together in an operational relationship. The lower housing member has in a central portion thereof, a body of solid state laser host material, with the laser host material typically having a rectangular cross-section with top and bottom surfaces, opposing side surfaces, and opposing end faces. The lower housing member also is configured to have a pair of spaces running the length of the laser host material. The upper housing member has on its underside, a pair of parallel flashlamps set a distance apart. The lower housing member is able to receive the upper housing member in an interfitted, operative relationship, in which the flashlamps are received in the respective spaces alongside the body of solid state laser host material. Importantly, the upper housing member is readily removable for the purpose of flashlamp replacement without affecting the alignment or operative condition of the solid state laser host material.

21 Claims, 3 Drawing Sheets

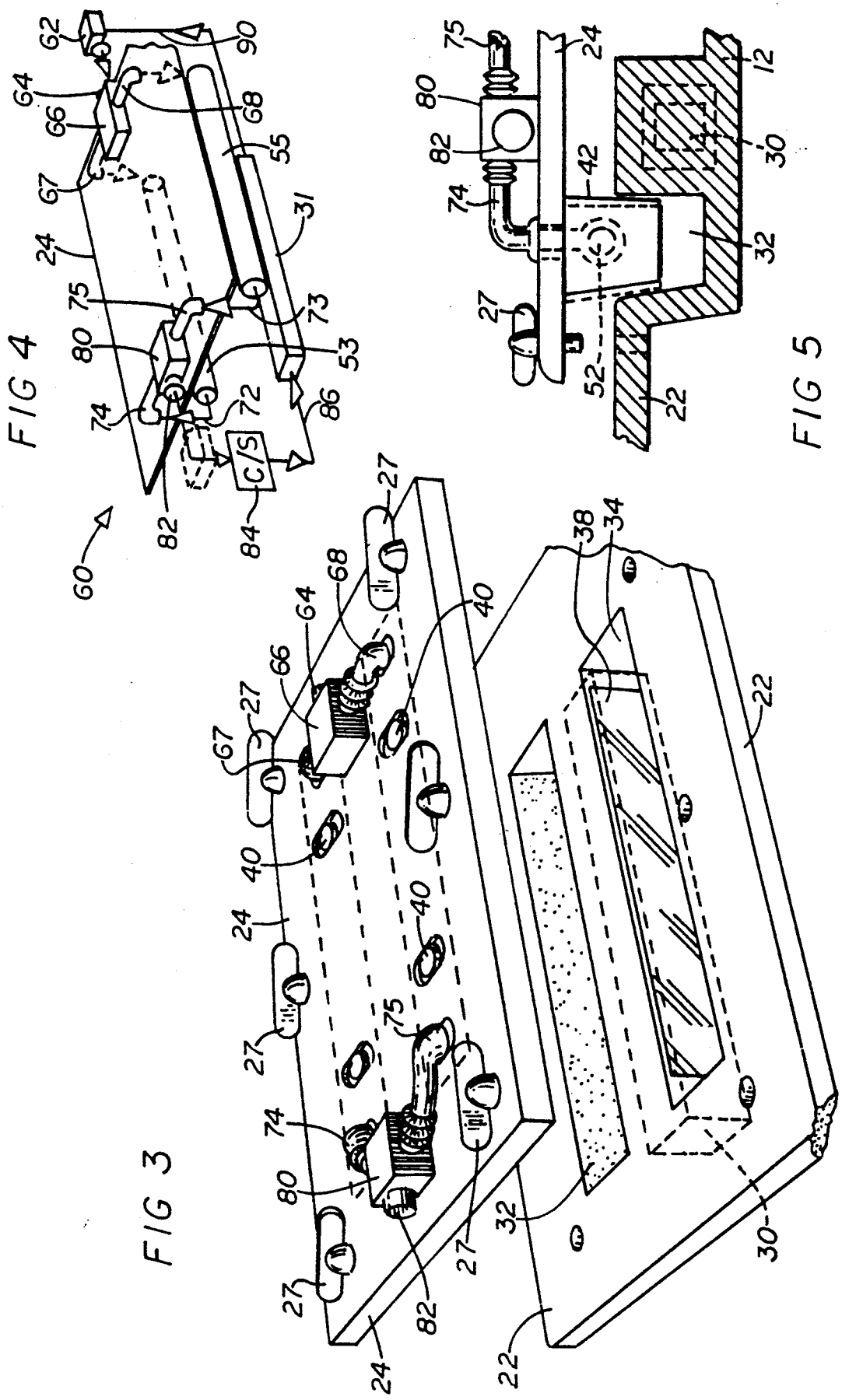

FLASHLAMP LINE REPLACEABLE UNIT

BACKGROUND OF THE PRIOR ART

As is well known, laser sources, particularly solid state lasers, are pumped optically. Light of a suitable wavelength is fed as excitation energy to the laser medium. When a high power laser is pumped, flash devices in the form of gas filled discharge lamps are used to provide such energy. Such flash lamps are ionization path devices and inasmuch as the laser is of elongate form, it is typically necessary to optically couple these to each other by locating the lamp and the laser within an elliptical or cylindrical chamber at the location of the respective focal points.

In the face pumped slab laser, a piece of rectangular solid state laser host material is placed in a housing with a light wave passing through the wide faces of the host material. Atoms in the host material are stimulated by a suitable radiation source such as a pair of lamps, and the interaction of the light wave with the host material atoms produces excitation at the fundamental wavelength of the medium.

The host material or solid state laser material may comprise a slab of Neodymium doped glass having a rectangular cross-section and highly polished side and end faces. The end faces through which the light wave passes are normally inclined at an angle with respect to the side surfaces. The slab is placed in a housing with the end faces exposed. A suitable pair of lamps may be mounted in the housing in alignment with the slab, for providing the radiation pumping to the atoms in the slab.

Because of the intense heat generated in pumping the host material, a coolant fluid is passed through the housing to remove heat. The coolant fluid is caused to pass along the sides of the slab, but the end surfaces must be sealed from the coolant.

Depending upon the operating conditions, the lamps have a limited operating life and, moreover, after a certain length of time of operation, the light output from a lamp can be expected to decrease. In addition to the natural aging of a lamp, sudden failure occurs as caused, for instance, by glass envelope breakage or similar sudden defects.

With presently known devices, the replacement of either a single lamp or a pair of lamps causes an annoying interruption of the laser operation. In order to exchange a lamp, the laser must be switched off and together with manual procedures required to replace the lamp or lamps in the chamber, the interruption may last an undesirable length of time.

If a laser source is used in production, the interruption of service for replacing a lamp causes undue delays and increased production costs. Obviously, given the present state of the art, such interruptions are unavoidable and have been accepted as a necessary fact of life. In order to overcome such interruptions, particularly those caused by aging of the lamp, it is possible to exchange lamps after a certain number of operating hours during scheduled shutdowns of production. In the latter case full advantage is not taken of the actual useful service life of a lamp and replacement costs are unnecessarily increased. While signal devices are known which indicate a decrease of the light output of the lamp in use, such devices do not overcome the need for a shutdown of operations for the sole purpose of replacing a lamp.

Current designs for dual flashlamp cavity boxes (pump cavities) require that the pump cavity assembly be removed in order to "change out" flashlamps. When the assembly is removed, normally the clean volume of the optical bed is violated, exposing all optical components to contamination. This requires, after the flashlamps are changed, that the optical bed volume be purged with dry Nitrogen after the cavity box assembly has been replaced. Even more consequential is the fact that the optical alignment of the laser slab or laser rod at re-installation, i.e., the re-positioning of the slab or rod with respect to the rest of the optics train, is critical to laser system output and performance. Even in laboratory conditions or "clean rooms," any dust particles, dirt, sand, etc. that may fall between any two mating surfaces may well be sufficient to critically misalign the slab or rod. Attempting to accomplish a flashlamp change in a field environment substantially increases the contamination risk such that the laser system may not supply adequate output, and in some instances, the misalignment may be severe enough to entirely preclude lasing.

Another important consideration is the contamination of optical surfaces. Any such contamination will result in burned optical components due to the very high energy levels present in the resonator.

One such solution to the logistic issues involved in utilizing a laser in the field may entail the use of a "portable clean room" with special tools and an adequate supply of dry Nitrogen. Any current implementation of such ideas is unclear. The presently accepted procedure for changing flashlamps is to remove the entire laser transmitter and change flashlamps in the nearest suitable facility, by a specially trained technicians. Many hours as well as a considerable amount of "down time" is necessarily involved. Provisioning spare pump cavity assemblies is a complex issue that up until the present invention has been without an inexpensive solution.

SUMMARY OF THE INVENTION

The present invention has its greatest utility for lasers which require a very high operational duty cycle, but it also has certain advantages for lasers used in the communication field and commercial applications.

The flashlamp line replaceable unit (LRU) in accordance with this invention is designed such that dual flashlamp laser cavity boxes can be removed and replaced as a single LRU, and not expose the clean volume of the laser optical bed to contaminates. Quite advantageously, the instant invention also eliminates the need of laser slab or rod removal and subsequent re-alignment. This LRU is designed so that no special tools nor any special environments are required to "change-out" the LRU.

The flashlamp LRU in accordance with this invention contains two lamp housings which are attached via captive hardware to the cover plate of the housings, and allow lateral movement to position and lock down the lamp housings once they are inserted. The flashlamp electrical connection is achieved during insertion by a hermetic feed-through dagger pin located in the laser slab housing. The materials used are the same as existing pump cavity designs. Coolant connections are to be quick-disconnect type hoses that require no tools for achieving a connection.

As will be discussed in greater detail hereinafter, a laser arrangement in accordance with this invention utilizes a pair of interfitting housing members, with one of the housing members serving to support solid state laser material aligned to provide a useful output. The other of the housing members is configured to support pumping means for producing excitation at the fundamental wavelength of the host laser material. The housing members, when in assembled relationship, are fully operational, but upon the pumping means becoming dysfunctional through extended use, the pumping means become readily replaceable upon the housing members being separated. Such replacement of the pumping means is, quite advantageously, accomplishable without disturbing the alignment of the solid state laser material.

It is therefore to be seen that a primary object of this invention is to provide a highly effective yet reasonably priced laser whose flashlamps can be readily replaced in the field, with minimal downtime.

It is another object of this invention to provide a laser of a relatively simple yet highly dependable design, which may have a very high operational duty cycle, or in other words, function at a high repetition (rep) rate, for extended periods.

It is still another object to provide a laser design wherein the alignment of the laser rod or laser slab need not in any manner be disturbed during flashlamp replacement.

It is yet another object of my invention to provide a laser device having separable housing members, with one housing member containing solid state laser material and the other housing member containing the pumping means for the laser material, such that upon separation of the housing members, the pumping means can be replaced without disturbing the alignment of the laser material, or the operability thereof.

It is yet still another object to provide a laser design permitting the ready replacement of the flashlamps utilized with a solid state laser, which advantageously does not require any special training, nor any technical expertise in order for the typical operator to accomplish an exchange of flashlamps, thereby reducing life cycle costs as well as maintenance costs.

These and other objects, features and advantages will become more apparent as the description proceeds.

BRIEF DESCRIPTION OF DRAWINGS

FIG. 3 is another perspective view of the upper and lower housing components, this view being concerned with certain of the plumbing details needed for coolant flow, and also revealing the elongate spaces alongside the laser slab, into which the flashlamp housings move when the housing members are interfitted;

FIG. 4 is a schematic of the flow paths for the coolant, in order that the laser slab and the flashlamps may be kept from overheating; and FIG. 5 is a fragmentary view, revealing how a typical flashlamp housing moves into its respective space alongside the laser slab.

DETAILED DESCRIPTION

Figure 1:
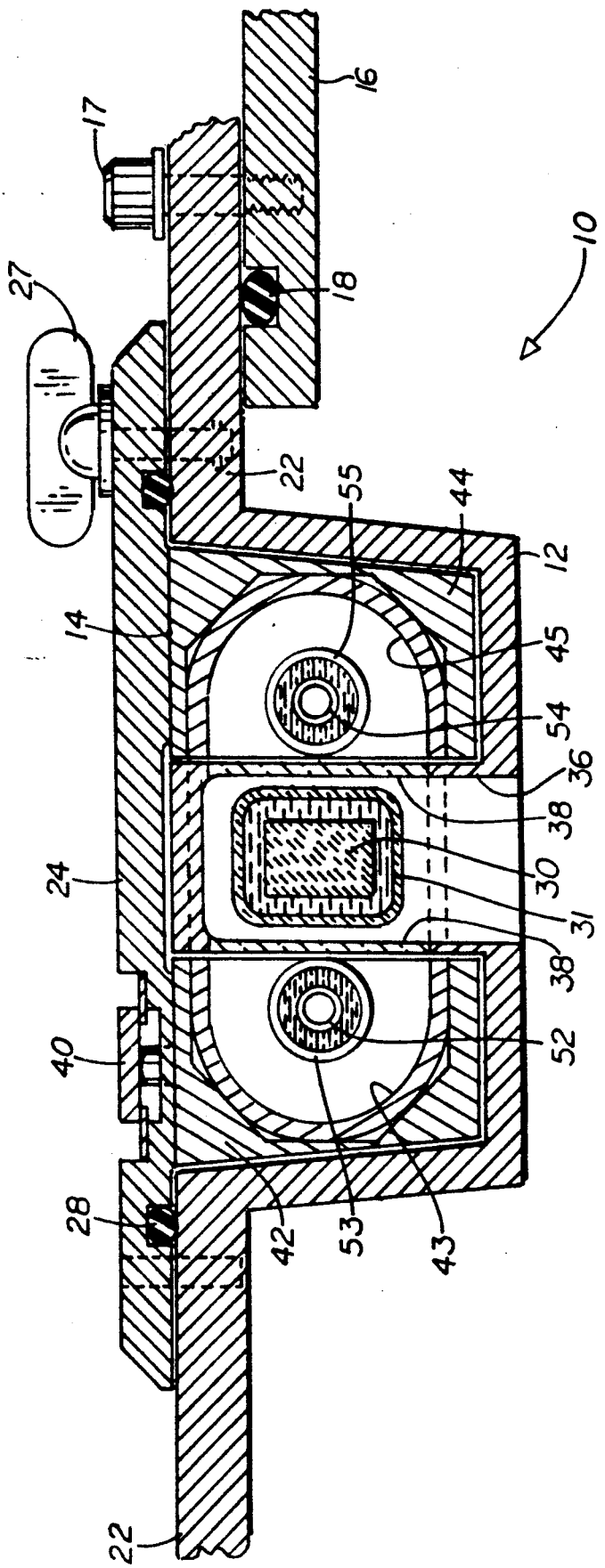
FIG. 1 is a cross-sectional view of a typical laser design in accordance with this invention, involving upper and lower housing members forming complementary, interfitting portions that can be readily separated when lamp replacement is necessary, without disturbing the alignment of the laser slab.

With initial reference to FIG. 1 it will be seen that I have provided a cross-sectional view of my laser device 10, involving a lower housing or slab housing 12, and an upper housing 14. The outer or flange portions 22 of the lower housing 12 rest on the optical bed 16, and these flange portions are normally secured to be optical bed by a series of bolts of the type shown at 17. An O-ring 18 placed around the upper edge of the optical bed 16 assures a tight-fitting, sealed relationship with the underside of the flange area 22 of the lower housing 12.

Figure 2:
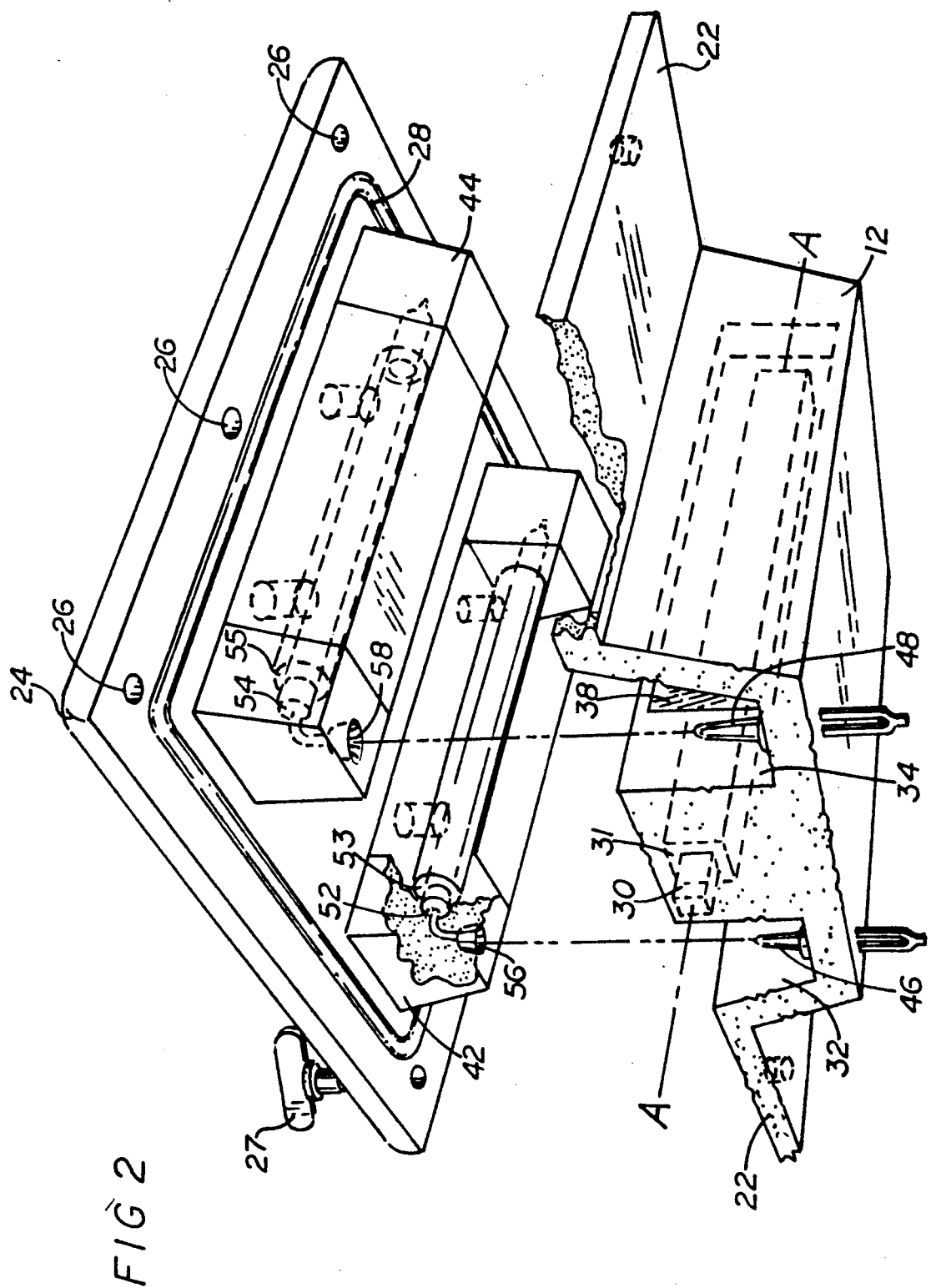
FIG. 2 is a perspective view from a location somewhat below the upper and lower housing members, showing these members in exploded relation in order to reveal the constructional details significant to this invention.

The upper housing 14 includes a cover plate 24, best seen in FIG. 2, around the periphery of which are a spaced series of holes 26. Into each of holes 26 is inserted a hold-down bolt 27, preferably of the so-called "quarter turn" type, as depicted in FIGS. 1 through 3. Fasteners of this type permit a desirable amount of lateral shifting of the cover plate with respect to the lower housing at the time of reassembly. Tightness of fit and seal integrity of the cover plate 24 of the upper housing to the upper side of the flange area 22 of the lower housing is assured by the use of an O-ring 28. Although I am not to be limited to any particular constructional materials, I prefer to construct the lower housing 12 of titanium, and the cover plate 24 of either titanium, aluminum or stainless steel.

The solid state laser material or laser slab 30 is operatively mounted on the lower housing 12 by conventional means, with the sides of the slab being surrounded by suitable coolant envelope 31, through which a fluid coolant is caused to flow during the operation of my device, in order to dissipate the considerable amount of heat generated. The fluid coolant is typically a suitable mixture of ethylene glycol and water, commonly called "EGW." Inasmuch as EGW is contaminated by contact with aluminum, the use of the latter metal in the design of my device is appropriately curtailed at any interface or contact with EGW.

The laser slab 30 preferably is of neodymium doped glass or neodymium doped YAG that is contained in a a mid portion 36 of housing member 12, as revealed in FIG. 1. On each side of this portion of the housing is a window 38, provided for a purpose to be described hereinafter. These windows 38 are preferably made of quartz or some other type of transparent material that can transmit the desirable pump bands, and one of the windows 38 is visible in FIG. 2 as well as in FIG. 3. It is to be understood that the mid portion 36 of the housing 12 represents a sealed space around the laser slab 30, which space, quite advantageously, remains entirely sealed and undisturbed during a flashlamp replacement operation.

Although I have described this embodiment of my invention as utilizing a laser slab 30, I am not to be limited to this, and as an example, the laser 30 could be a Nd:YAG rod type laser.

The plumbing connections to the coolant envelope 31 will be explained in connection with FIGS. 3 through 5, wherein the plumbing system 60 will be discussed.

It is to be noted that this invention principally involves a pair of flashlamps readily replaceable in the field, accomplished without disturbing the alignment or integrity of the laser slab 30. That this may be accomplished, I mount a pair of lamp housings 42 and 44 on the underside of the cover plate 24, in each of which lamp housings a flashlamp is operationally mounted, by the use of captive screws or fasteners 40. Captive fastener 40 is integrated into housings 42 and 44 at the time of assembly and allows the required lateral motion when the LRU is mated to the lower housing 12. I am not to be limited to the use of titanium in the construction of the lamp housings, but such is the preferred material to insure contamination free operation.

In FIG. 1 it can be seen that a reflector 43 is utilized in lamp housing 42, and that a reflector 45 is utilized in lamp housing 44. It is to be understood that the reflectors 43 and 45 are of elongate configuration, being coextensive in length with the respective flashlamps utilized therein, and positioned at the optimum distance from the flashlamps and the laser slab for effective pumping.

In FIG. 2 it can be seen that flashlamp 52 is located in lamp housing 42, and flashlamp 54 is located in lamp housing 44. From FIG. 2 as well as FIG. 1 it can be seen that in accordance with a preferred embodiment, an integral coolant envelope 53 surrounds flashlamp 52, and an integral coolant envelope 55 surrounds flashlamp 54, so that the flow of coolant fluid around each flashlamp vital to its continued operation can be readily effected. This arrangement is quite effective thermodynamically, and it brings about a reduction in nucleate boiling at the flashlamp surface, which in turn improves optical coupling efficiency. Furthermore, the use of the integral cooling envelopes around the flashlamps enables relatively inexpensive materials such as barium sulphate to be utilized in the construction of the reflectors 43 and 45. Barium sulphate could not be used if contacted by the coolant fluid.

I am not to be limited to the use of integral cooling envelopes surrounding the flashlamps, for as an alternative, the coolant fluid can be caused to flow through the entire length of the flashlamp cavities, and thus effect the cooling of the flashlamps. In this latter instance, the reflectors 43 and 45 would be made of silver, gold or the like.

With continued reference to FIG. 2, it can be seen that the lower housing member 12 is somewhat of a "W" configuration in cross-section, with the laser slab or solid state laser material 30 supported on the central portion of the lower housing. The lower housing member, which is sometimes referred to herein as the one housing member, is configured so as to have an elongate space on each side of the laser slab. As viewed in FIG. 2, an elongate space 32 exists on the left side of the laser slab, and an elongate space 34 exists on the right side of the laser slab, with each of these spaces extending for the length of the lower housing 12. Also to be noted in this figure is the coolant envelope 31, which is confined to surrounding the sides of the laser slab 30, with the ends of the laser slab being left free so that lasing will not be inhibited. The useful output of the laser slab is the energy stored and extracted during oscillation, which produces laser light output along the output axis of the slab 30, here shown as axis A—A.

Continuing with FIG. 2, it will be seen that lamp housing 42 is disposed directly above the space 32 to the left of the laser slab, with the lamp housing 44 being disposed directly above the space 34 to the right of the laser slab. As is thus to be understood, when the upper housing 14 is moved into operative relationship with the lower housing 12, the lamp housings 42 and 44 are caused to occupy the spaces 32 and 34, respectively, and to be positioned to properly supply pumping energy to the laser slab 30, through the previously mentioned windows 38.

In FIG. 2 it will also be noted that electrical terminal or dagger pin 46 is disposed in a generally upwardly directed position in space 32, and electrical terminal or dagger pin 48 is disposed in a generally upwardly directed position in space 34. Some slight angularity of these electrical terminals may be preferred, such as 6° off the vertical to match the insertion angle of the housings.

Directly above the terminals 46 and 48 are apertures 56 and 58, with aperture 56 being located on the underside of lamp housing 42, directly below one end of the flashlamp 52, and with aperture 58 being located on the underside of lamp housing 44, directly below one end of the flashlamp 54. Both of these apertures represent sealed fittings.

Upon the upper and lower housings being moved into assembled relation, in the general manner depicted in FIG. 5, the electrical terminal 46 enters aperture 56, and electrical terminal 48 enters aperture 58, thus to supply the flashlamps 52 and 54 with electrical power. Upon a proper fit being achieved, the hold down bolts are fastened to prevent undesired separation of the upper and lower housings. Thereafter, upon the upper housing being lifted away from the lower housing at the time of flashlamp replacement, electric power is automatically removed from the flashlamps when the terminals pull out of their apertures.

With reference now to FIGS. 3 through 5, it can be seen that I there reveal pertinent details of the plumbing system 60 that I utilize to keep the flashlamps 52 and 54, as well as the slab 30 suitably cool during operation of my device, even though the laser is being operated at a high rep rate. In FIG. 4 it will be seen that the fitting 62 on the optical bed 16 supplies coolant to the laser device 10, with the fitting 62 being connected to fitting 64 on the housing cover plate 24. Quick disconnect type fittings are utilized. The fitting 64 is part of the header member 66, latter having outlet legs 67 and 68 connected thereto. These outlet legs extend downwardly through the cover plate 24 and then connect to the integral coolant tubes or envelopes 53 and 55 that surround the flashlamps 52 and 54.

The coolant flows through the coolant envelopes 53 and 55, serving the vital function of keeping the flashlamps from overheating during use, after which the coolant flows as indicated in FIG. 4, through passages 72 and 73, then passing upwardly through the cover member 24. The coolant then enters passages 74 and 75 on the upper surface of member 24, with the coolant thereafter entering fitting 80. From fitting 80, the coolant then exits through quick disconnect fitting 82, and into a mating fitting connected to the Cooling System 84, captioned C/S. The Cooling System is to be understood to include a pump, such as of the mechanically coupled impeller type; a coolant reservoir, to hold the EGW supply; and the heat exchanger. The heat exchanger (not illustrated) serves to transfer heat from EGW to air, or from EGW to liquid.

From the Cooling System 84, the coolant then moves through line 86 downwardly, connecting with coolant envelope or flow tube 31 that surrounds the laser slab 30. The coolant reaches the envelope 31 through a hose and fitting integral to housing 12. As will be readily understood, the coolant passing through the envelope 31 serves the vital function of keeping the laser slab 30 cool during operation. A magnetically coupled impeller type pump, as mentioned above, is typically used to circulate coolant through the cooling system.

After exiting from the coolant envelope 31, the coolant passes along passage 90 which, as shown in FIG. 4, connects with the fitting 62 on the optical bed 16.

It should now be clear that by the use herein of quick disconnect fittings, it is easy after the coolant circulation system has been shut off, to break these connections and prepare the cover plate 24 and the pair of lamp housings 42 and 44 for removal from the lower housing 12. The release of the six or so hold down bolts 27 from the peripheral portions of the cover plate 24 makes it then possible to lift away the lamp housings from their respective spaces 32 and 34.

In the interests of minimizing down time, I envision the stocking of fully functional upper housing members 14, rather than suggesting the replacement in the field of just the flashlamps.

As should now be clear, I have provided a highly effective design enabling flashlamp replacement under field conditions, without any special environment being needed, and without any particular training of the personnel being required.

I claim:

1. A laser arrangement utilizing a pair of interfitting housing members, with one of said housing members serving to support a non-cylindrically shaped solid state laser material, and the other of said housing members having at least one reflective cavity surface in which pumping means are supported, said pumping means serving, when energized, to produce excitation in said laser material, said one housing member being contiguous to an optical bed in which a resonator is contained, said housing members being fully operational to produce a useful output, said pumping means being replaceable when said housing members have been separated, such replacement of said pumping means being accomplishable without disturbing the alignment of said solid state laser material and without accessing the clean volume of said optical bed.

2. The laser arrangement as recited in claim 1 in which said pumping means is constituted by a pair of flashlamps supported in a parallel, spaced apart relationship upon said other housing member, said one housing member providing an elongate space on each side of said solid state laser material, to receive said flashlamps when said housing members have been interfitted in an operational manner.

3. The laser arrangement as recited in claim 2 in which a common cooling arrangement, utilizing liquid coolant, is employed for keeping said flashlamps and said solid state laser material from overheating.

4. The laser arrangement as recited in claim 2 in which each of said flashlamps is mounted in a curved reflective cavity, with a liquid coolant being utilized to keep said flashlamps from overheating.

5. The laser arrangement as recited in claim 4 in which the liquid coolant flows through an integral coolant envelope that closely surrounds each flashlamp.

6. The laser arrangement as recited in claim 4 in which the liquid coolant flows through the reflective cavity in which each flashlamp is disposed.

7. A laser apparatus featuring an arrangement for enabling a ready replacement of the light sources used for pumping a laser slab that is an integral part of an optical bed in which a resonator is utilized, said apparatus comprising a first housing, and a second housing interfitted with said first housing, a laser slab being disposed in a central portion of said first housing, with a space being defined along each side of said laser slab, said first housing being contiguous to the optical bed in which said resonator resides, said second housing containing a spaced apart pair of pumping light sources, said light sources being contained in reflective cavities disposed to enter said spaces at the time said first and second housing are interfitted, so as to be positioned to pump said laser slab, said second housing being removable for light source replacement without violating the clean volume associated with the optical bed.

8. A laser apparatus as set forth in claim 7, said cavities being of elliptical cross-section.

9. A laser apparatus as set forth in claim 7, said cavities being of circular cross-section.

10. The laser apparatus as recited in claim 7 in which a liquid coolant is utilized to keep said pumping light sources from overheating.

11. The laser arrangement as recited in claim 10 in which the liquid coolant flows through an integral coolant envelope that closely surrounds each flashlamp.

12. The laser arrangement as recited in claim 10 in which the liquid coolant flows through the reflective cavity in which each flashlamp is disposed.

13. The laser apparatus as set forth in claim 7 in which coolant means are provided such that a continuous flow of coolant fluid can be utilized for removing heat from said laser slab and said pumping light sources during operation of said laser apparatus, said coolant means being configured such that the same coolant fluid is circulated along said laser slab as flows past said light sources.

14. The laser apparatus as set forth in claim 13 in which quick disconnect fittings are utilized at selected locations in said coolant means, such that said first and second housings are readily separated for lamp replacement without consequential fluid loss.

15. An improved pumping arrangement for use in a face pumped or edge pumped slab laser, said arrangement comprising:

a first housing member having in a central portion thereof, a body of solid state laser host material, said laser host material having a rectangular cross-section with top and bottom surfaces, opposing side surfaces, and opposing end faces;

said first housing member being contiguous with an optical bed in which a resonator is contained, said first housing member defining a pair of spaces running the length of said laser host material, and a second housing member having a pair of parallel flashlamps set a distance apart, said first housing member receiving said second housing member in an interfitted relationship, in which said flashlamps are received in respective spaces alongside said body of solid state laser host material, said second housing member being readily removable for the purpose of flashlamp replacement without affecting the alignment of said solid state laser host material, and without violating the clean volume associated with the optical bed.

16. The improved pumping arrangement as set forth claim 15 in which coolant means are provided such that a continuous flow of coolant fluid can be utilized for removing heat from said laser host material and said flashlamps during operation of said laser, said coolant means being configured such that the same coolant fluid can be circulated along said laser host material as flows past said flashlamps.

17. The improved pumping arrangement as set forth in claim 16 in which quick disconnect fittings are utilized at selected locations in said coolant means, such that said first and second housing members can be readily separated for flashlamp replacement without consequential fluid loss.

18. The laser arrangement as recited in claim 15 in which each of said flashlamps is mounted in a curved reflective cavity, with a liquid coolant being utilized to keep said flashlamps from overheating.

19. The laser arrangement as recited in claim 18 in which the liquid coolant flows through an integral coolant envelope that closely surrounds each flashlamp.

20. The laser arrangement as recited in claim 18 in which the liquid coolant flows through the reflective cavity in which each flashlamp is disposed.

21. An improved laser configuration involving a solid state lasing medium, and pumping means therefor, said laser configuration utilizing first and second housing members, said first housing member residing in a contiguous relationship to a laser optical bed, said first housing member containing said lasing medium and defining a pair of spaces running the length of said lasing medium, said second housing member having a pair of flashlamps placed at an exterior portion thereof, which flashlamps constitute said pumping means, and which are thus isolated from the clean volume of the laser optical bed, said first housing member configured to receive said second housing member in an interfitted relationship, in which each of said flashlamps is received in a respective one of said spaces disposed alongside said body of solid state lasing medium, said second housing member being readily removable from said first member for the purpose of flashlamp replacement without affecting the alignment of said solid state lasing medium and without violating the clean volume of the optical bed.

* * * * *